US012596795B2

(12) United States Patent
Pascali et al.

(10) Patent No.: US 12,596,795 B2
(45) Date of Patent: Apr. 7, 2026

(54) GENERATION TECHNIQUE IN A COMPUTERIZED ENVIRONMENT

(71) Applicant: Amadeus S.A.S., Biot (FR)

(72) Inventors: Alessandro Pascali, Biot (FR); Yasser Tba, Biot (FR); Giorgio Calandriello, Biot (FR); Selim Bessassi, Biot (FR)

(73) Assignee: AMADEUS S.A.S., Biot (FR)

( * ) Notice: Subject to any disclaimer, the term of this patent is extended or adjusted under 35 U.S.C. 154(b) by 185 days.

(21) Appl. No.: 18/280,029

(22) PCT Filed: Feb. 28, 2022

(86) PCT No.: PCT/EP2022/054927
§ 371 (c)(1),
(2) Date: Sep. 1, 2023

(87) PCT Pub. No.: WO2022/194522
PCT Pub. Date: Sep. 22, 2022

(65) Prior Publication Data
US 2024/0070272 A1        Feb. 29, 2024

(30) Foreign Application Priority Data

Mar. 15, 2021    (EP) ..................................... 21305318

(51) Int. Cl.
*G06F 21/55*        (2013.01)
*G06F 21/54*        (2013.01)

(52) U.S. Cl.
CPC ............ *G06F 21/554* (2013.01); *G06F 21/54* (2013.01); *G06F 21/552* (2013.01)

(58) Field of Classification Search
CPC ....... G06F 21/554; G06F 21/54; G06F 21/552
See application file for complete search history.

(56) References Cited

U.S. PATENT DOCUMENTS 5,566,092 A * 10/1996 Wang ................. G05B 19/4184
706/912
5,991,881 A * 11/1999 Conklin .................. H04L 41/00
709/224

(Continued)

OTHER PUBLICATIONS

European Patent Office, International Search Report and Written Opinion issued in International patent application serial No. PCT/EP2022/054927 on Jun. 1, 2022, 12 pages.

(Continued)

*Primary Examiner* — Linglan Edwards
*Assistant Examiner* — Kamryn J Gillespie
(74) *Attorney, Agent, or Firm* — Perry + Currier Inc.

(57)        ABSTRACT

A method for detecting a current attack in a computerized environment is automatically performed by one or more computerized hosts (50) of the computerized environment. The method comprises generating a signature (22) which is specific for a type of activity in the computerized environment based on historic data (20, 21) of the activity, the signature (22) specifying averaged normalized numbers of occurrences of the activity per time frame of a plurality of recurring time frames. The method further comprises determining a threshold value for the activity based on the historic data of the activity and a statistical measure. The method further comprises monitoring current data of the activity in the computerized environment, and generating an attack detection alert based on determining that the current data of the activity exceeds the threshold value for a current time frame.

17 Claims, 6 Drawing Sheets

(56)                    References Cited

U.S. PATENT DOCUMENTS

| | | | |
|---|---|---|---|
| 6,321,338 B1 * | 11/2001 | Porras ................. | H04L 63/1416 709/224 |
| 2001/0039579 A1 * | 11/2001 | Trcka ................... | G06F 21/552 709/224 |
| 2002/0083175 A1 * | 6/2002 | Afek ................... | H04L 63/1458 709/239 |
| 2002/0107953 A1 * | 8/2002 | Ontiveros .............. | H04L 43/06 709/224 |
| 2002/0133586 A1 * | 9/2002 | Shanklin ................ | H04L 43/06 709/224 |
| 2004/0250124 A1 * | 12/2004 | Chesla ................. | G06F 21/552 709/224 |
| 2012/0210429 A1 | 8/2012 | Stute | |

OTHER PUBLICATIONS

Konrad Rieck, "Machine Learning for Application-Layer Intrusion Detection", Thesis Tu Berlin,,Jul. 6, 2009 (Jul. 6, 2009), p. 1-151, XP007913622.
Seong Soo Kim, et al., "NetViewer: A Network Traffic Visualization and Analysis Tool", USENIX, USENIX, The Advanced Computing Systems Association, Nov. 13, 2005 (Nov. 13, 2005), p. 1-12, XP06100906.

* cited by examiner

FIG. 1

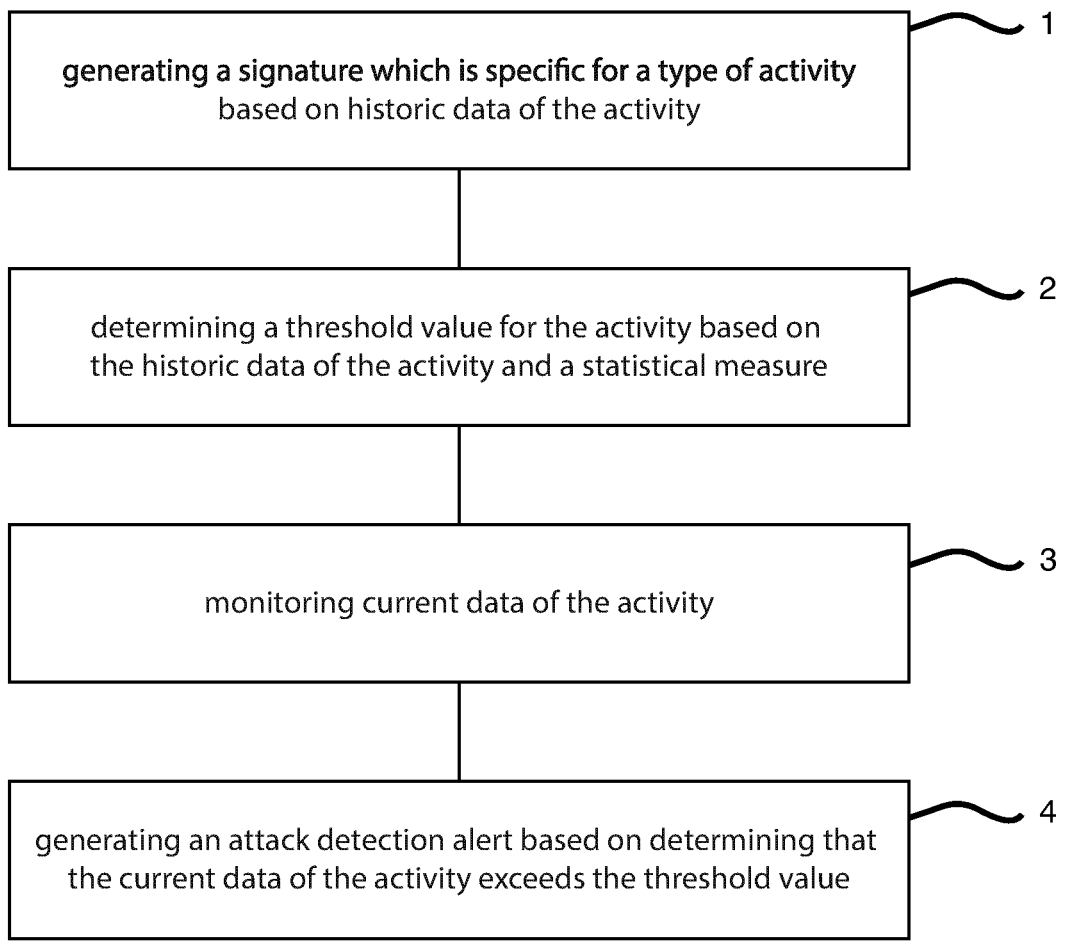

generating a signature which is specific for a type of activity based on historic data of the activity — 1 determining a threshold value for the activity based on the historic data of the activity and a statistical measure — 2 monitoring current data of the activity — 3 generating an attack detection alert based on determining that the current data of the activity exceeds the threshold value — 4

GENERATION TECHNIQUE IN A COMPUTERIZED ENVIRONMENT

FIELD

The present mechanisms generally relate to information technology security, more specifically to detecting a current attack in a computerized environment.

BACKGROUND

It is known that an intruder can attack a computerized environment to steal data and/or illegally access services. This is regularly accompanied by activities in the computerized environment. Traditionally, an attack can be detected retrospectively by analyzing log files that record occurrences of such activities. It is desirable to detect an attack as early as possible, especially while the attack is still happening.

SUMMARY

The present mechanisms are defined by the independent claims.

According to a first aspect, a method for detecting a current attack in a computerized environment is automatically performed by one or more computerized hosts of the computerized environment. The method comprises generating a signature which is specific for a type of activity in the computerized environment based on historic data of the activity, the signature specifying averaged normalized numbers of occurrences of the activity per time frame of a plurality of recurring time frames. The method further comprises determining one or more threshold values for the activity based on the historic data of the activity and a statistical measure. The method further comprises monitoring current data of the activity in the computerized environment. The method still further comprises generating an attack detection alert based on determining that the current data of the activity exceeds one or more of the one or more threshold values for a current time frame.

Another aspect pertains to a device being configured to perform such a method for detecting a current attack in a computerized environment.

Another aspect pertains to a computer program configured for detecting a current attack in a computerized environment according to such a method.

Further aspects are set forth by the dependent claims.

BRIEF DESCRIPTION OF THE DRAWINGS

FIG. 1 is a flow diagram of an example method for detecting a current attack in a computerized environment.

DESCRIPTION

Figure 2:
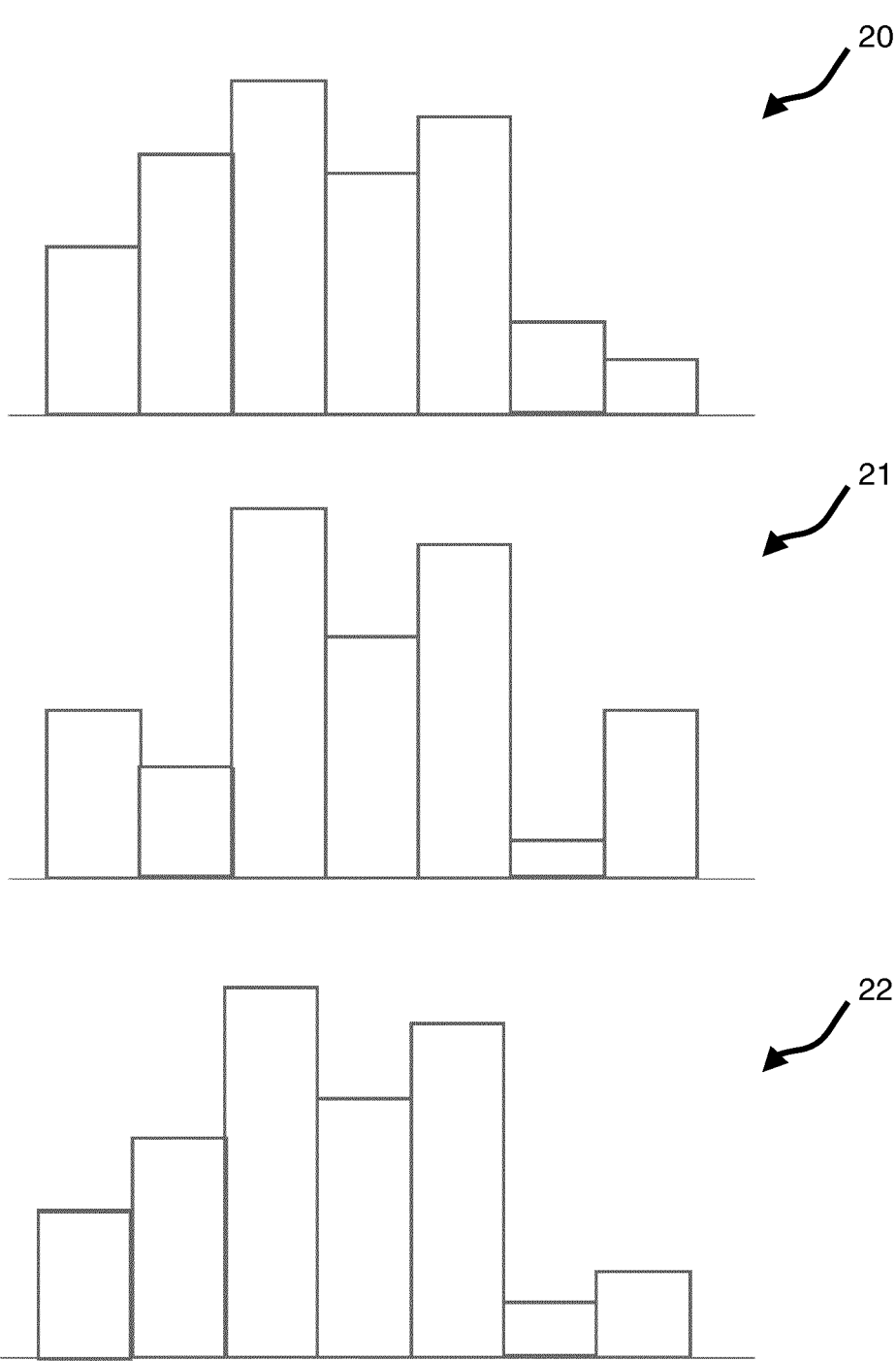
FIG. 2 schematically shows an example signature.

The method for detecting a current attack in a computerized environment is automatically performed by one or more computerized hosts of the computerized environment. The method comprises generating a signature which is specific for a type of activity in the computerized environment based on historic data of the activity, the signature specifying averaged normalized numbers of occurrences of the activity per time frame of a plurality of recurring time frames. The method further comprises determining one or more threshold values for the activity based on the historic data of the activity and a statistical measure. The method further comprises monitoring current data of the activity in the computerized environment. The method still further comprises generating an attack detection alert based on determining that the current data of the activity exceeds one or more of the one or more threshold values for a current time frame. This allows for early indicating a possible current attack, such as anomalies or significant deviations from usual system behavior. For example, this also allows for early detection of external attacks as well as a user misusing the computerized environment by performing actions that do not conform to a general usage of the computerized environment.

A signature can be understood as a fingerprint for a specific activity. In that a signature is based on averaged normalized numbers of occurrences of the activity, the signature is a uniform representation and provides for a comparable profile for the specific activity. This enables to share the signature between different entities, e.g. between different computerized hosts, and/or for detecting current attacks in different computerized hosts.

The following description is formulated in relation to a threshold, but is to be understood as referring to one or more thresholds, unless explicitly stated otherwise. The threshold value for the activity is based on historic data of the activity. For example, this allows the method to learn automatically from the history. It also allows the method to adjust independently to regular long-term developments, for example if the activity occurs increasingly more often or less frequently when viewed over a large time scale. In that the determining of the threshold value is further based on a statistical measure, the method can detect attacks even if there is a sparse data basis, for example because the monitored activity occurred naturally less frequently in a time frame in the past. This also allows attacks to be detected more reliably if a frequency of the specific activity is subject to fluctuations by itself.

In short, the method enables detection of an attack based on such activities that occur regularly in the normal operation of the computerized environment. Further, due to a synergistic effect of the features described above of generating a time frame signature based on historic data of the activity and determining a threshold value based on the historic data and a statistical measure, the method enables detection of attacks in progress, particularly when sparse data is available. This helps to reduce the damage caused by the attack, especially compared to conventional methods of detecting attacks that are based, for example, on a retrospective evaluation of log files or are based on certain activities that are typical of attacks but atypical of normal operation of the computerized environment.

In some embodiments, the type of activity is a CPU usage, a memory usage, an application launch, a service request, an interface access, a database transaction, a login attempt, a firewall event and/or a network traffic. For example, the type of activity is a sensor input and/or an actuator output, e.g. a water level sensor input, key press input, or a motor start or stop command output. In some embodiments, monitoring current data of the activity in the computerized environment includes determining a frequency of the respective type of activity. For example, the current data is the number of times the type of activity occurred in a monitoring time interval. For example, the activity is a measurable and quantifiable activity.

In some embodiments, monitoring current data of the activity includes applying a filter to count for certain instances of the type of activity only. For example, when monitoring the current data of the activity, launches of certain applications are monitored, but launches of other applications are ignored, i.e. filtered out from monitoring. This applies mutatis mutandis to some or all of the other types of activity monitored, e.g. service requests, interface accesses, data base transactions, login attempts, firewall events and/or network traffic in some embodiments.

In some embodiments, the time frame has a length of one day, one week, one month or one year. For example, the time frame coincides with a day of the week, a week of the year, a month of the year, a season and/or a weekend. This prevents false alarms by, for example, being able to consider seasonal variations in the frequency of activity in the computing environment. Seasonal is understood to mean on a daily basis, weekly basis, monthly basis, yearly basis, seasonal basis or weekend basis.

In some embodiments, the time frame comprises a plurality of sub-frames, wherein generating the signature comprises generating an averaged normalized number per sub-frame. For example, the sub-frame can correspond to one hour. This prevents false alarms by, for example, being able to consider seasonal variations in the frequency of activity in the computing environment, where 'seasonal variations' are possible at high temporal resolution, e.g. on an hourly basis. For example, regular variations between morning, noon, afternoon, evening and/or night can be considered.

Preferably, the plurality of recurring time frames is chosen neither too large nor too small in order not to inhibit the self-learning property of the method and nevertheless to compensate for historic statistical fluctuations as far as possible. In some embodiments, the plurality of recurring time frames is formed by the most recent two, three, four, five, six, twelve, twenty-four, thirty, thirty-six, forty-eight, fifty-two, seventy-two or three hundred and fifty-six past time frames.

In some embodiments, the statistical measure is a 3-sigma value of the signature. This allows the threshold value to compensate for the fact that the frequency of the activity is subject to statistical variation from frame to frame. Ultimately, this can reduce false alerts, for example.

In some embodiments, the method further comprises updating the signature and/or the threshold value for each time frame. This means that the signature and/or the threshold value are each updated after a period of a time frame has elapsed.

In some embodiments, the historic data is adjusted for a contribution from the oldest time frame considered in the historic data as soon as a new, current time frame enters the historic data.

In some embodiments, determining that the current data of the activity exceeds the threshold value for a current time frame is based on current data monitored for a monitoring interval, e.g. a sliding window. The monitoring interval specifies a duration for which current occurrences of the activity contribute to the current data. If the monitoring interval is chosen too large, attacks can be overlooked; if it is chosen too small, a few clustered activities can trigger a false alert. Therefore, in some embodiments, the monitoring interval corresponds to a duration of the sub-frames and/or is in the range of twice, half or quarter of this duration. In some embodiments, a minimum monitoring interval is 1 minute, 5 minutes, 10 minutes, 30 minutes and/or 1 hour. In some embodiments, a maximum monitoring interval is 5 minutes, 10 minutes, 30 minutes, 1 hour, 2 hours, and/or 4 hours.

In some embodiments, generating the attack detection alert comprises sending a message. For example, sending a message includes sending a short message (SMS), an E-Mail, a network notification and/or a push notification. In some embodiments, the message is sent to a computerized host performing the method to detect a current attack or to a user of that host. In some embodiments, the message is sent to a computerized host other than the host performing the method to detect a current attack. In some embodiments, the message is sent to a mobile device, e.g. of an administrator, and/or to a service provider and/or operator of the computerized environment.

Additionally or alternatively, in some embodiments, generating the attack detection alert comprises at least one of closing a network connection, terminating a task, disabling a service and blocking a user. This allows an attack to be actively and autonomously averted by the computerized environment. In some other embodiments, no such closing, terminating or blocking is taken. This avoids undesired interference with regular users.

In some embodiments, generating the attack detection alert is further based on whether the activity originates from a single actor, i.e. process, service, host, network device, IP address, regional code (e.g. obtained from an IP address) and/or user account, and/or a single type of activity. For example, if the monitored activities come from different sources, this may coincide with an external event, e.g. school holidays, Christmas, sporting events, nice weather, which motivates many users to access the computerized host and/or use services provided by the computerized host at the same time. In such a situation the fact that the current data of the activity exceeds the threshold value for a current time frame does not mean an attack.

In some embodiments, generating an attack detection alert is based on determining that the current data of the activity exceeds the threshold value for more than one host of the computerized environment. For example, this allows for detecting an orchestrated current attack by multiple distributed sources. In some embodiments, generating the attack detection alert is further based on a distribution of the monitored actions among different actors.

In some embodiments, avoiding false alerts is improved by detecting whether the current data of the activity of multiple similar hosts remain covariant. For example, the method can include linking together different similar hosts by their signatures and generating an attack detection alert based on determining covariant behavior of these hosts.

In some embodiments, generating the attack detection alert is further based on whether the activity originates from a process, service, host, network device, IP address, regional code (e.g. obtained from an IP address) and/or user account, which had previously shown abnormalities, for example that an attack detection alert has been generated based on determining that the current data of said activity exceeds the threshold value.

Attacks often trigger different types of activity at the same time, e.g. login attempts, database requests, firewall events, etc. In some embodiments, generating the attack detection alert is further based on determining that monitored current data of an activity of another type exceeds a threshold value for the current time frame.

In some embodiments, the computerized host is selected from at least one of a firewall device and a data base server.

In some embodiments, a computerized host, including at least one processor and program code configured upon execution by the at least one processor to perform any of the aforementioned methods, or a program product comprising a computer readable medium and program code stored on the computer readable medium and configured upon execution by at least one processor to perform the any of the aforementioned methods, may also be provided.

The above described can be beneficial in computerized environments such as open environments or environments providing electronic marketplaces with many actors interacting. For example, this enables to detect fraudulent access and modifications to airline reservations on a travel platform computerized environment, to detect a robot in an open video game computerized environment, to detect a hacked account on a computerized environment providing an e-commerce web site, and/or to detect a malware on a network.

These and other advantages and features are set forth in the claims annexed hereto and forming a further part hereof. However, for a better understanding of the advantages and objectives attained through its use, reference should be made to the drawings, and to the accompanying descriptive matter, in which there is described exemplary embodiments.

Turning now to the drawings, wherein like numbers denote like parts throughout the several views. FIG. 1 schematically illustrates an example method for detecting a current attack in a computerized environment. The method is automatically performed by one or more computerized hosts of the computerized environment. The method includes the following according to blocks 1 to 4: According to block 1, a signature is generated, which is specific for a type of activity in the computerized environment based on historic data of the activity. The signature specifies averaged normalized numbers of occurrences of the activity per time frame of a plurality of recurring time frames. Then, a threshold value for the activity is determined based on the historic data of the activity and a statistical measure in block 2. In block 3, current data of the activity is monitored in the computerized environment. In block 4, an attack detection alert is generated based on determining that the current data of the activity exceeds the threshold value for a current time frame.

FIG. 2 shows schematically as histograms historic data 20, 21 and an example signature 22 for an example time frame of one week. Thus, the signature 22 in this example represents a fingerprint for the occurrence of the activity for time frames with the length of one week. In the example of FIG. 2, the signature 22 is based on two past time frames. In some other examples, the signature may be based on a number N of time frames, e.g. a number of time frames covering one year, i.e. fifty-two time frames. In other words, in some examples, historic data 20, 21 may comprise a number N of time frames.

The columns of the histograms coincide with sub-frames of the signature 22 and each represent historic data of a weekday. In some other examples, sub-frames coincide with one hour. The signature 22 has been generated based on the historic data 20, 21 and specifies averaged normalized numbers of the historic data of occurrences of an activity in the computerized environment. For example, the occurrence of the action is counted sub-frame wise, summed over the time frame (i.e. all sub-frames of the time frame) and the counts of the individual sub-frames divided by the sum.

In some example methods, the threshold value is determined as follows: Assuming that the historical data 20, 21 comprises N time frames and each time frame comprises M sub-frames, the historical data 20, 21 can be understood as N*M counts of activities. For example, the N*M counts can be modelled as a Gaussian distribution and a maximum three-sigma value can be determined as the threshold. The three-sigma value represents three standard deviations from a mean of the N*M counts.

In some examples, for each of the M sub-frames, a portion of the historical data comprising sections of the N time-frames corresponding to the respective sub-frame is modelled by a statistical model, and a respective threshold for each sub-frame of the signature is determined based on the portion of the historical data and a statistical measure.

The signature, together with the thresholds (be they on a time scale of the time frame in some examples or on a time scale of the sub-frames of the signature in some other examples), enables early detection of attacks.

Figure 3A:
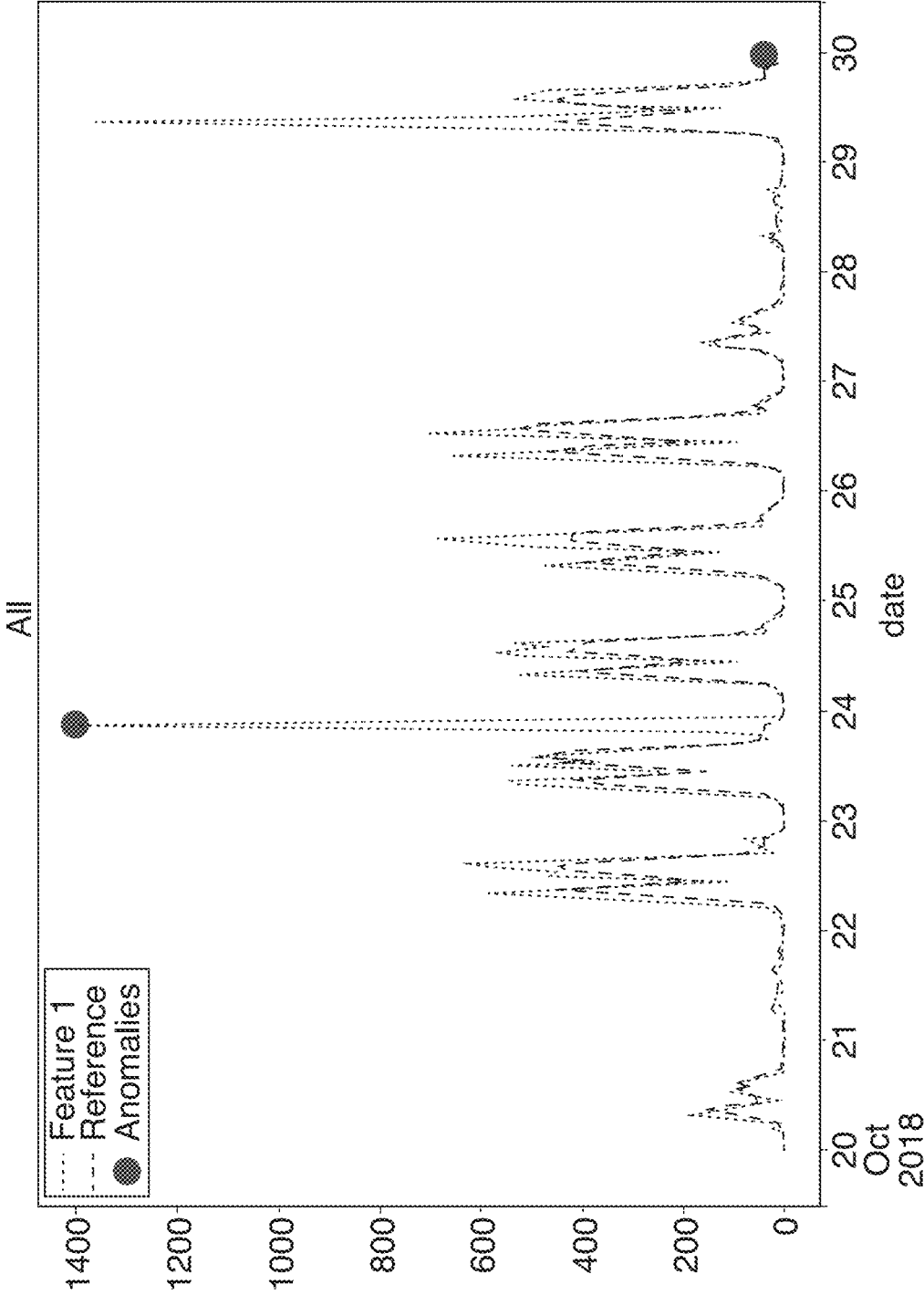
FIG. 3A and FIG. 3B schematically show monitored current data of an activity and an example signature.

FIG. 3A schematically illustrates monitored current data of an activity on an hourly basis for several days and a reference which is based on a signature for a one-week time frame with a sub-frame resolution of one hour. Further, in FIG. 3A two anomalies have been highlighted, where the current data of the activity exceeds a threshold value for a current time frame. As the anomaly on the right shows, the method enables the detection of attacks based on an absolutely small number of activities.

Figure 3B:
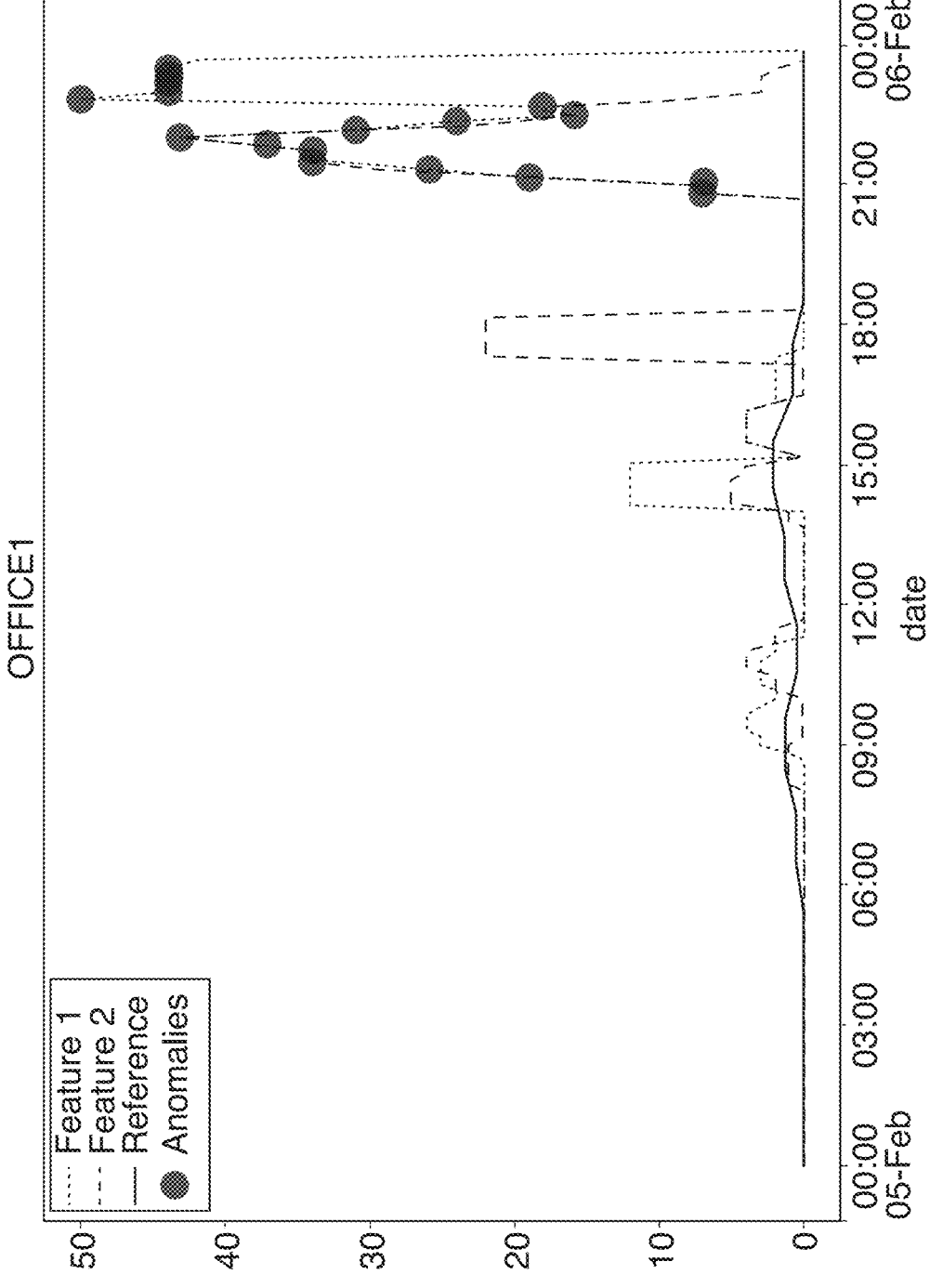

FIG. 3B shows another example of monitored current data of two different types of activity and a reference which is based on a signature with a sub-frame resolution of one hour. In the right part of FIG. 3B, both monitored activities show anomalies. By monitoring two types of activities, a false alert can be avoided more reliably. Therefore, in some examples, generating an attack detection alert is based on determining that the current data of at least two activities exceeds threshold values for a current time frame. In these examples, the method comprises generating a respective signature for each type of activity, i.e. generating at least two signatures, e.g. in a manner as described before. Correspondingly, in these examples, the method comprises determining respective threshold values for each type of activity, i.e. generating at least two threshold values, e.g. in a manner as described before.

In some examples, generating a signature is individually carried out for each of multiple computerized hosts of the computerized environment. In these examples, a host can have its own signature. In some other examples, generating a signature is carried out for a first host. Such generated signature is then used for detecting attacks on a second host. In some examples, a threshold value determined for a first host is scaled by a certain factor and used for detecting attacks on a second host.

Figure 4:
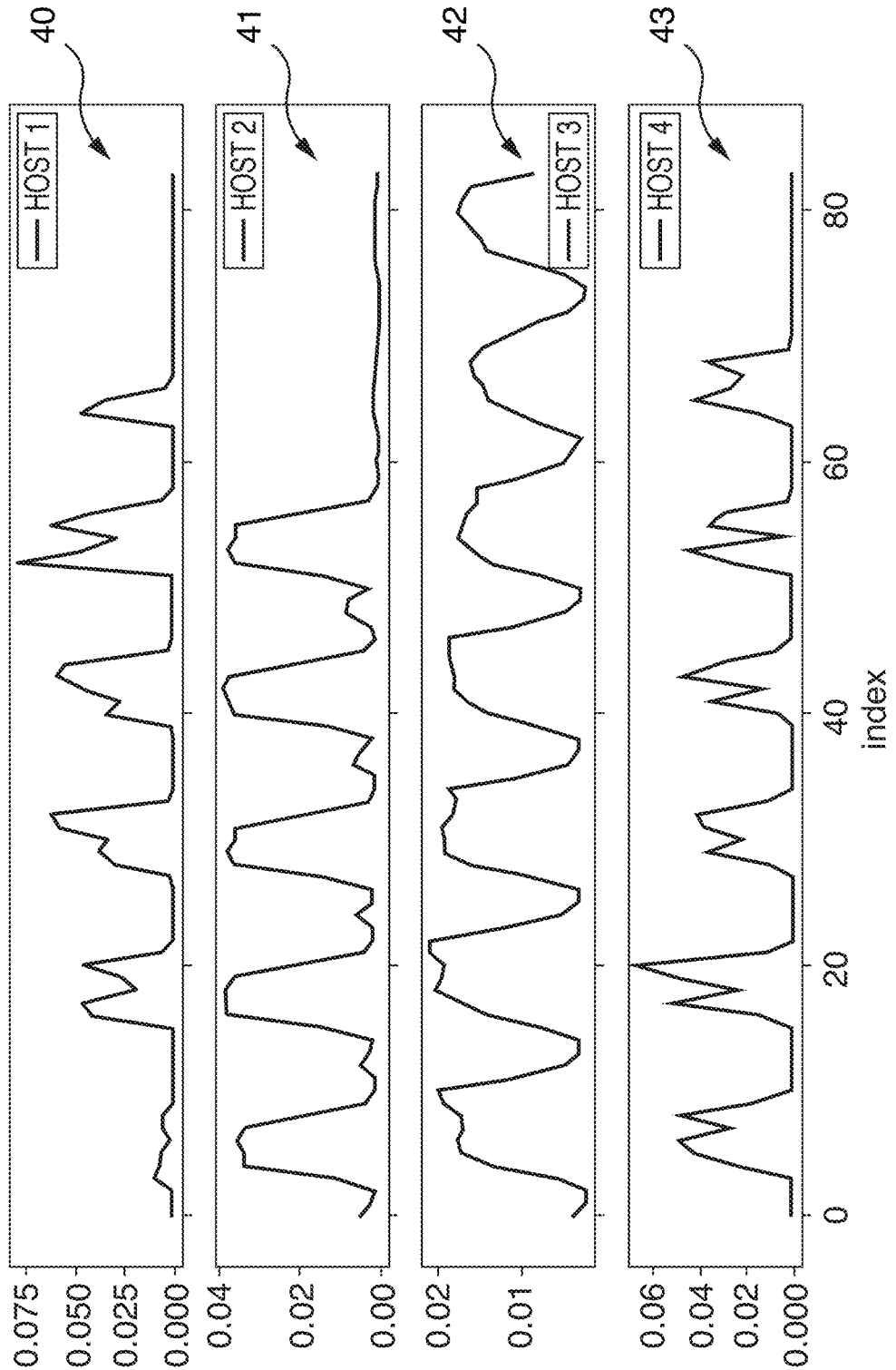
FIG. 4 schematically shows further example signatures.

FIG. 4 shows schematically four different signatures 40, 41, 42, 43 for four different computerized hosts or four different sub-networks of the computerized environment. In their essence, the signatures 40, 41, 42, 43 coincide. However, by creating individual signatures 40, 41, 42, 43 for each host or sub-networks, it is possible to consider the particularities of each host/sub-network. For example, activities for some hosts in some sub-frames are significantly lower than for other hosts, or occur in more limited time windows. In that the signature represents a fingerprint of occurrences of a type of activity, attacks can be detected more reliably, especially at an early stage.

Figure 5:
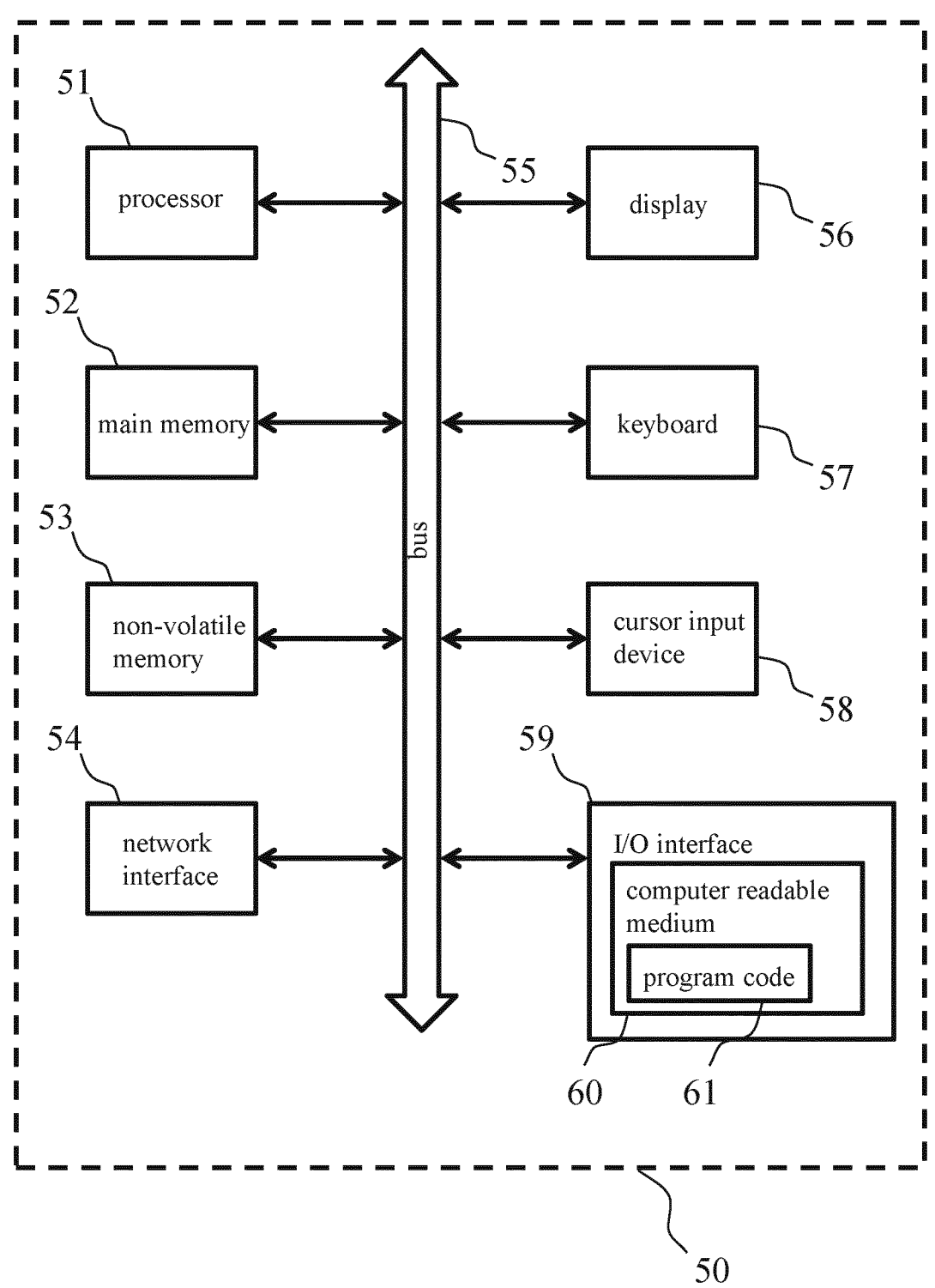
FIG. 5 is a block diagram illustrating an example computerized host and an example computer program product.

FIG. 5 is a diagrammatic representation of the internal structure of an example computerized host 50 which implements the methods described herein. This structure may also apply to an example client or an example server which are configured to implement the methods described herein.

The computerized host 50 includes a processor 51, a main memory 52 and a non-volatile memory 53, e.g. a hard drive, non-removable flash, a solid state drive and/or a removable memory card such as a Micro or Mini SD card, which permanently stores the software enabling computerized host 50 to execute its functions, for example an operating system. Furthermore, the computerized host 50 includes a display 56, a keyboard 57 and, optionally, a cursor input device 58 (such as a mouse). Optionally, an additional I/O interfaces 59 such as card reader and USB interfaces may be present. Optionally, the computerized host 50 includes a network interface 54 (e.g. a wireless network interface such as a Wi-Fi and/or Bluetooth interface) and/or a 2G/3G/4G mobile network interface device. All of them 51-54 and 56-59 communicate with each other via a bus 55.

The computerized host 50 is arranged to execute a program code 61 stored on a computer readable medium 60, to cause it to perform any of the methodologies explained above. For example, the program code 61 may at least include the GUI definition document. An executable set of instructions i.e. the program code 60 embodying any one, or all, of the methodologies described above, resides completely, or at least partially, permanently on a computer readable medium 61, which can be accessed by the computerized host 50 through the I/O interface 59. Optionally, the program code 61 may be additionally or alternatively stored in the non-volatile memory 53. For example, the program code 61 may be copied from the computer readable medium 60 being temporally connected with the computerized host 50 via the I/O interface 59 into the non-volatile memory 53. When being executed, respective process data resides in the main memory 52 and/or the processor 51. The program code 61 may further be transmitted or received as a propagated signal through the wired or wireless network interface 54 from/to a software server within a local area network or the Internet.

Although certain products and methods constructed in accordance with the teachings have been described herein, the scope of coverage of this patent is not limited thereto. On the contrary, this patent covers all embodiments of the teachings of the invention fairly falling within the scope of the appended claims either literally or under the doctrine of equivalents.

The invention claimed is:

1. A method for detecting a current attack in a computerized environment, the method being automatically performed by one or more computerized hosts of the computerized environment, and the method comprising:

generating a signature which is specific for a type of activity in the computerized environment based on historic data of the activity, wherein the signature specifies averaged normalized numbers of occurrences of the activity per time frame of a plurality of recurring time frames;

determining a threshold value for the activity based on the historic data of the activity and a statistical measure;

monitoring current data of the activity in the computerized environment; and generating an attack detection alert based on determining that the current data of the activity exceeds the threshold value for a current time frame, wherein:

(a) each recurring time frame is a fixed, predefined interval that repeats cyclically; and, (b) the averaged normalized number for the recurring time frame is produced by:

(i) counting occurrences of the activity in each sub-frame of that recurring time frame over a plurality of previous cycles of the recurring time frame;

(ii) summing the counts from the plurality of cycles for each sub-frame to obtain a total count for the recurring time frame; and (iii) dividing, for each sub-frame, the summed count of that sub-frame by the total count for the recurring time frame.

2. The method of claim 1 wherein the type of activity is an application launch, a service request, an interface access, a data base transaction, a login attempt, a firewall event, or a network traffic.

3. The method of claim 1 wherein the statistical measure is a 3-sigma value of the signature.

4. The method of claim 1 further comprising:
updating the signature for each time frame.

5. The method of claim 1 wherein determining that the current data of the activity exceeds the threshold value for a current time frame is based on the current data monitored for a sliding window.

6. The method of claim 1 wherein generating the attack detection alert comprises:
sending a message.

7. The method of claim 1 wherein generating the attack detection alert comprises closing a network connection, terminating a task, disabling a service, or blocking a user.

8. The method of claim 1 wherein generating the attack detection alert is further based on determining that monitored current data of an activity of another type exceeds a threshold value for the current time frame.

9. A computerized host configured for detecting a current attack in a computerized environment, the computerized host comprising:

at least one processor; and at least one non-volatile memory comprising instructions that, upon execution by the at least one processor, cause the computerized device to perform operations comprising:

generating a signature which is specific for a type of activity in the computerized environment based on historic data of the activity, wherein the signature specifies averaged normalized numbers of occurrences of the activity per time frame of a plurality of recurring time frames;

determining a threshold value for the activity based on the historic data of the activity and a statistical measure;

monitoring current data of the activity in the computerized environment; and generating an attack detection alert based on determining that the current data of the activity exceeds the threshold value for a current time frame, wherein:

(a) each recurring time frame is a fixed, predefined interval that repeats cyclically; and (b) the averaged normalized number for the recurring time frame is produced by:

(i) counting occurrences of the activity in each sub-frame of that recurring time frame over a plurality of previous cycles of the recurring time frame;

(ii) summing the counts from the plurality of cycles for each sub-frame to obtain a total count for the recurring time frame; and (iii) dividing, for each sub-frame, the summed count of that sub-frame by the total count for the recurring time frame.

10. The computerized host of claim 9 wherein the type of activity is an application launch, a service request, an interface access, a data base transaction, a login attempt, a firewall event, or a network traffic.

11. The computerized host of claim 9 wherein the statistical measure is a 3-sigma value of the signature.

12. The computerized host of claim 9 wherein the operations further comprise:

updating the signature for each time frame.

13. The computerized host of claim 9 wherein the operation of determining that the current data of the activity exceeds the threshold value for a current time frame is based on the current data monitored for a sliding window.

14. The computerized host of claim 9 wherein the operation of generating the attack detection alert comprises:

sending a message.

15. The computerized host of claim 9 wherein the operation of generating the attack detection alert comprises closing a network connection, terminating a task, disabling a service, or blocking a user.

16. The computerized host of claim 9 wherein the operation of generating the attack detection alert is further based on determining that monitored current data of an activity of another type exceeds a threshold value for the current time frame.

17. A non-transitory computer-readable storage medium comprising instructions that, upon execution by a processor of a computing device, cause the computing device to perform operations comprising:

generating a signature which is specific for a type of activity in the computerized environment based on historic data of the activity, wherein the signature specifies averaged normalized numbers of occurrences of the activity per time frame of a plurality of recurring time frames;

determining a threshold value for the activity based on the historic data of the activity and a statistical measure;

monitoring current data of the activity in the computerized environment; and generating an attack detection alert based on determining that the current data of the activity exceeds the threshold value for a current time frame; wherein:

(a) each recurring time frame is a fixed, predefined interval that repeats cyclically; and (b) the averaged normalized number for the recurring time frame is produced by:

(i) counting occurrences of the activity in each sub-frame of that recurring time frame over a plurality of previous cycles of the recurring time frame;

(ii) summing the counts from the plurality of cycles for each sub-frame to obtain a total count for the recurring time frame; and (iii) dividing, for each sub-frame, the summed count of that sub-frame by the total count for the recurring time frame.

* * * * *